(12) United States Patent
Muser (10) Patent No.: US 8,832,551 B2
(45) Date of Patent: Sep. 9, 2014

(54) VIDEO-BASED UNDO AND REDO OPERATIONS

(75) Inventor: Marino Muser, Belmont, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 117 days.

(21) Appl. No.: 13/468,678

(22) Filed: May 10, 2012

(65) Prior Publication Data

US 2013/0305151 A1 Nov. 14, 2013

(51) Int. Cl.
*G06F 3/00* (2006.01)
*G11B 27/34* (2006.01)
*G06F 9/455* (2006.01)

(52) U.S. Cl.
CPC ............ *G06F 9/45512* (2013.01); *G11B 27/34* (2013.01)
USPC ............ 715/704; 715/716; 715/719; 715/723

(58) Field of Classification Search
CPC .................................................. G06F 9/45512
USPC .......... 715/704, 723, 229, 973, 974, 716, 719
See application file for complete search history.

(56) References Cited

U.S. PATENT DOCUMENTS

| 6,750,890 | B1 * | 6/2004 | Sugimoto | 715/838 |
| 8,533,593 | B2 * | 9/2013 | Grossman et al. | 715/704 |
| 2005/0216840 | A1 * | 9/2005 | Salvucci | 715/723 |
| 2008/0250314 | A1 * | 10/2008 | Larsen | 715/705 |
| 2011/0252301 | A1 * | 10/2011 | Vollmer et al. | 715/229 |
| 2014/0161244 | A1 * | 6/2014 | Jones et al. | 379/202.01 |

OTHER PUBLICATIONS

M. Derthick, S.F. Roth, Enhancing data exploration with a branching history of user operations, Elsevier Science B.V., Knowledge-Based Systems 14 (2001) 65-74.*

* cited by examiner

*Primary Examiner* — Tadeese Hailu
(74) *Attorney, Agent, or Firm* — Hamilton, Brook, Smith & Reynolds, P.C.

(57) ABSTRACT

A computer-implemented method includes creating a video record of user interactions with a computer program, and displaying a control area configured to receive a rewind user command and an advance user command. In response to receiving the rewind user command, the computer program reverts to a first state that is prior to at least one of the recorded user interactions. In response to receiving the advance user command, the computer program progresses to a second state that is between the first state and a last-known state of the computer program.

14 Claims, 6 Drawing Sheets

VIDEO-BASED UNDO AND REDO OPERATIONS

BACKGROUND OF THE INVENTION

The embodiments described herein relate generally to operating computer programs and, more particularly, to tracking and modifying user interactions with computer programs.

Many known computer programs include an "undo" command that erases the last change made to a document. This command reverts the document to an older state. Similarly, many known computer programs a "redo" command that reverses a previous undo command by, for example, advancing a buffer of the document to a more current state.

However, when using the undo command, at least some known computer programs do not give the user adequate feedback about the exact command that has been undone. For example, when using at least some known computer programs, the document is restored to a previous state without providing a hint or an indication of what was actually changed. Such a limitation becomes especially problematic when using the undo command repeatedly.

At least some known computer programs have attempted to mitigate this problem using an undo/redo log that provides a partial list of actions that can be undone or redone. The user can select from the list an action to be undone and, in general, that action and all proceeding that action are reverted. However, even this approach provides too little feedback to the user, especially when the same or very similar actions are repeated.

BRIEF DESCRIPTION OF THE INVENTION

In one aspect, a computer-implemented method includes creating a video record of user interactions with a computer program, and displaying a control area configured to receive a rewind user command and an advance user command. In response to receiving the rewind user command, the computer program reverts to a first state that is prior to at least one of the recorded user interactions. In response to receiving the advance user command, the computer program progresses to a second state that is between the first state and a last-known state of the computer program.

In another aspect, a computer includes a display device, an input device, and a memory area configured to store a video record of user interactions with a computer program. The computer also includes a processor coupled to the display device, input device, and memory area. The processor is configured to cause the display device to display a control area. In response to receiving a rewind user command via the input device, the processor causes the display device to revert to a first state of the computer program that is prior to at least one of the recorded user interactions. In response to receiving an advance user command via the input device, the processor causes the display device to progress to a second state of the computer program that is between the first state and a last-known state of the computer program.

In another aspect, a computer program product includes one or more non-transitory computer-readable storage media having computer-executable components thereon. The components include a recording component that when executed by a processor causes the processor to store a video record of user interactions with a computer program within a memory area, and an input recognition component that causes the processor to receive a signal representative of a user input from an input device. The components also include a control component that causes the processor to transmit to a display device a signal representative of a control area. In response to receiving a rewind user command via the input device, the control component causes the processor to transmit to the display device a signal representative of a reversion to a first state of the computer program that is prior to at least one of the recorded user interactions. In response to receiving an advance user command via the input device, the control component causes the processor to transmit to the display device a signal representative of a progression to a second state of the computer program that is between the first state and a last-known state of the computer program.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

Exemplary embodiments of systems, methods, apparatus, and computer-program products for use in enabling undo and redo operations within a computer program interface are described herein. The embodiments described herein enable users to leverage visual and temporal memory of what operations have been used within the computer program. Frequently, the interactions that the user wants to undo are in the recent past, such as during the last few seconds or minutes. The user may have a visual memory of the course of those actions. The ability to undo or redo changes by effectively rewinding a movie depiction of what was done is much more intuitive than the current approach and is also more accurate, resulting in fewer user mistakes.

Exemplary technical effects of the systems, methods, apparatus, and computer-program products described herein include at least one of: (a) creating a video record of user interactions with a computer program using a computer architecture; (b) storing the video record in a memory area; (c) displaying a control area configured to receive a rewind user command and an advance user command; (d) reverting to a first state that is prior to at least one of the recorded user interactions in response to receiving the rewind user command; and (e) progressing to a second state of that is between the first state and a last-known state of the computer program in response to receiving the advance user command.

Figure 1:
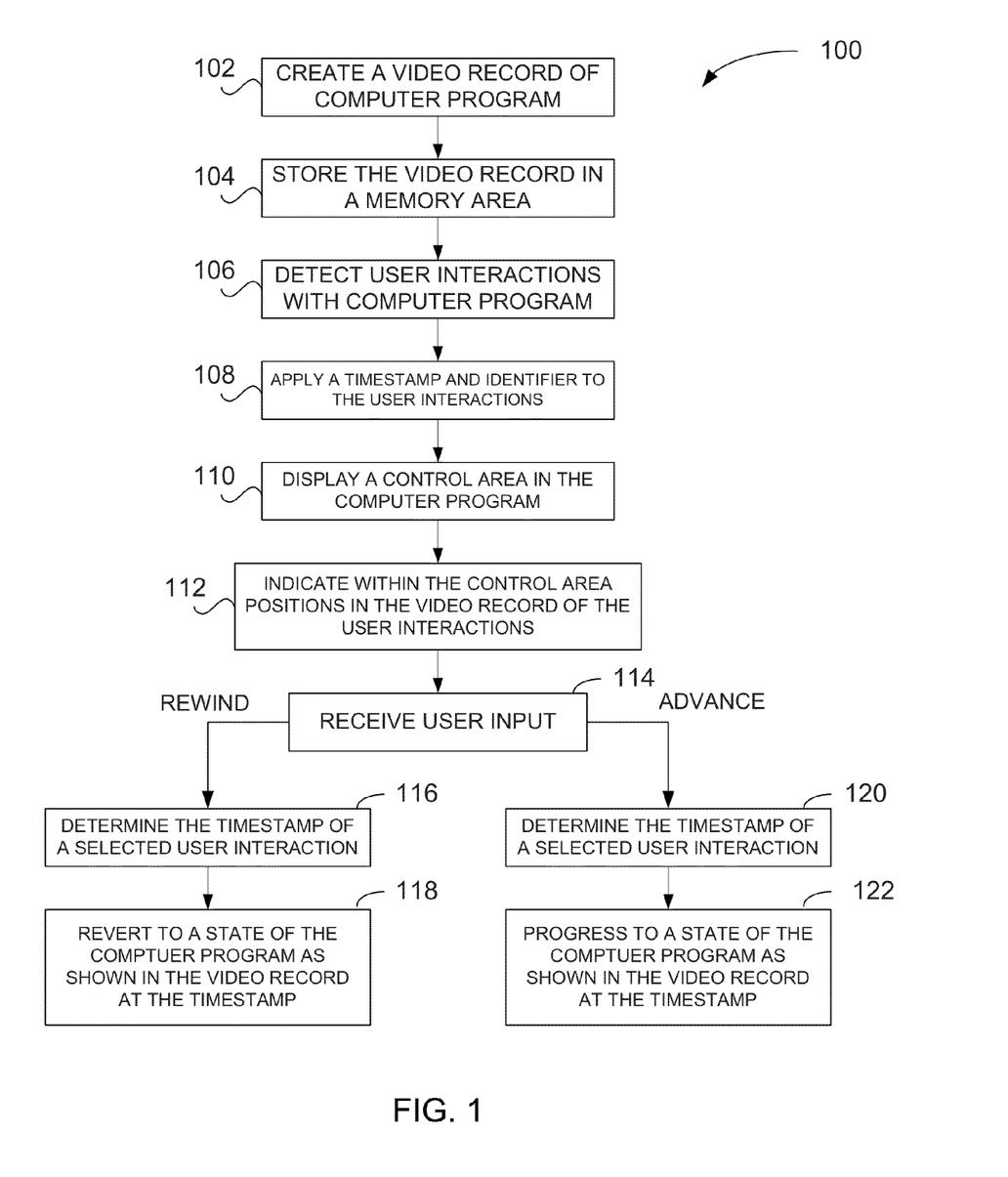
FIG. 1 is a flowchart of an exemplary computer-implemented method.

FIG. 1 is a flowchart 100 of an exemplary computer-implemented method for enabling undo and redo operations within a computer program interface. In an exemplary embodiment, a user interacts with a computer program as is known in the art. The computer program may be a word processing program, a spreadsheet program, a presentation program, a video game, an image manipulation program, or any other computer program that is capable of receiving and tracking user interactions. In an exemplary embodiment, the computer program creates 102 a video record of the software display and user interactions. The video record may be created using any known method of recording a computer screen. Exemplary video recording software, the likes of which may be used within or in conjunction with a computer program, include but are not limited to CamStudio™, Camtasia Studio®, or DemoCreator (CamStudio is available from CamStudio.org; Camtasia Studio is commercially available from TechSmith Corporation of Okemos, Mich., USA; DemoCreator is commercially available from Wondershare Software Co., Ltd. of P.R. China). However, it should be understood that any video recording software may be used. Alternatively, the video record may be created using still frames that are captured at a specified rate or any other method that enables replay of a video of software display and user interactions.

In an exemplary embodiment, the video record is stored 104 in a memory area. As described in greater detail below, the memory area may be housed within the computer, attached but external to the computer, or may be remote to the computer such as a network drive. In some embodiments, the user is able to specify the location in which the video record is stored. Moreover, in an exemplary embodiment, a computer on which the computer program is running detects 106 the user interactions. The term "user interactions" includes, but is not limited to only including, text entry or modification interactions, menu selections, formatting interactions, image entry or manipulation interactions, or any other user interaction that may be tracked by a computer or computer program. As the video record is stored in the memory area or, more specifically, as the user interactions are stored in the memory area, the computer applies 108 a timestamp and a unique identifier for each user interaction. This enables the computer to more granularly track the user interactions. In some embodiments, the computer will perform re-sizing of the video record file or files such that only a certain number of user interactions are available to the user, or such that only a certain amount of time within the video record is available to the user.

In an exemplary embodiment, the computer displays 110 a control area that enables the user to undo or redo user interactions with the computer program. The control area may be positioned along, for example, a window border of the computer program. Alternatively, the control area may be a floating modal dialog within the window of the computer program or outside of the window of the computer program. In some embodiments, the user may reposition the control area by dragging the control area to a desired location. In an exemplary embodiment, the computer indicates 112 within the control area the time positions of at least a portion of the recorded user interactions. While navigating, the computer displays to the user the state of the computer program changing, as if the user were watching a video of the changes made to the computer program.

During operation of the computer program, the computer receives 114 user input related to undoing or redoing one or more particular user interactions. As described in greater detail below, the user input may be via dragging a cursor icon along a timeline using a mouse, via arrow buttons, page up and page down buttons, gestures, or any other suitable input method. When the user releases the cursor, the computer program is restored to its state at the selected point in time. Regardless of the method of input, the user input will be either a rewind user command or an advance user command. Moreover, the user will reposition the cursor such that it erases a past chosen user interaction indicator in order to affect an undo command. Alternatively, the user will reposition the cursor such that a previously undone user interaction indicator is again displayed in order to affect a redo command. If the user input is a rewind user command, the computer reverts to a first state of the computer program that is prior to the user interactions that are cancelled, deleted, or undone. For example, the computer determines 116 the timestamp of each user interaction as the cursor passes an associated indicator. The computer also reverts 118 the display of the computer program to reflect the state of the computer program at the time just prior to the original detection of the cancelled, deleted, or undone user interaction. If the user input is an advance user command, the computer progresses to a second state of the computer program that is between the first state and a last-known state of the computer program. For example, the computer determines 120 the timestamp of each user interaction as the cursor passes an associated indicator. In order to redo a previously cancelled, deleted, or undone user interaction, the computer progresses 122 to a state of the computer program as shown in the video record at the time just after the now restored user interaction.

Figure 2A:
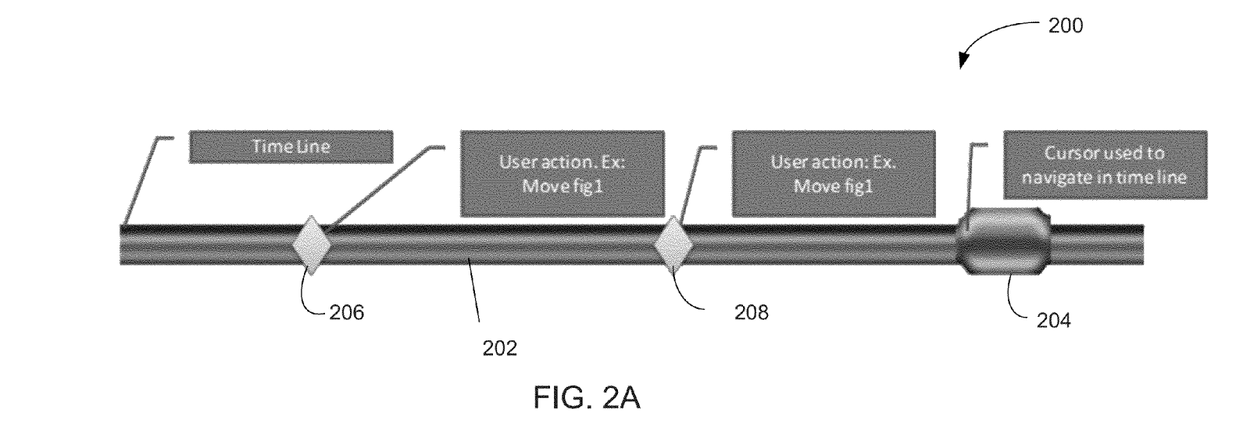
FIGS. 2A and 2B are exemplary illustrations of one embodiment of a control area that may be used with the computer-implemented method shown in FIG. 1.
Figure 2B:
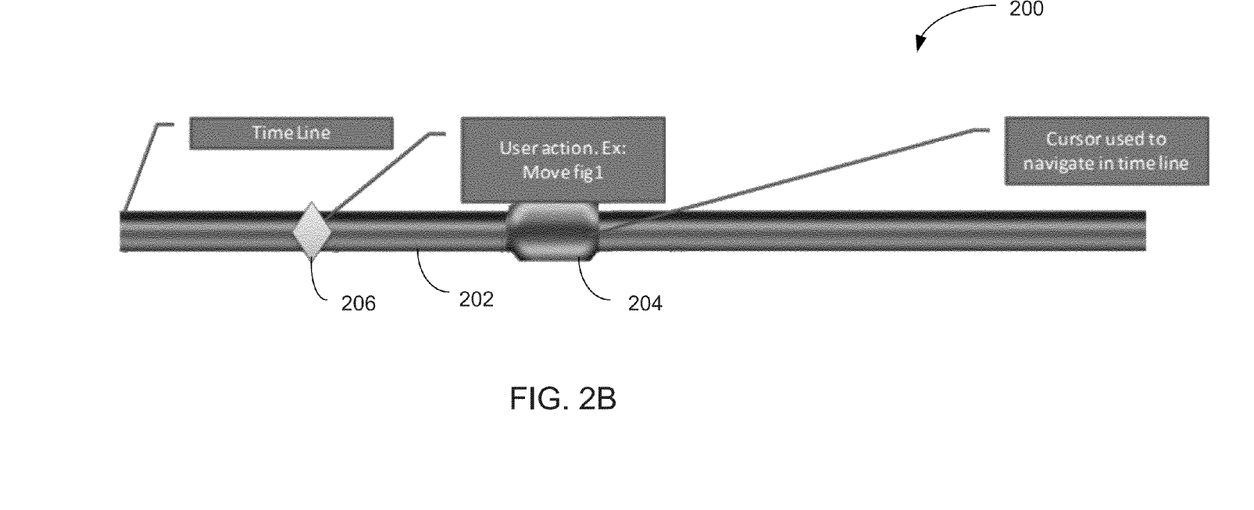

FIGS. 2A and 2B are exemplary illustrations of one embodiment of a control area 200. Specifically, FIG. 2A illustrates a state of the computer program before the cursor 204 has been manipulated by the user, and FIG. 2B illustrates a state of the computer program after the cursor 204 has been manipulated by the user. As shown in FIGS. 2A and 2B, the control area 200 includes a timeline 202 and a cursor 204. Moreover, the control area 200 includes a number of user interaction indicators 206, each associated with a specific user interaction with the computer program. As noted above, the user interactions may be text entry or modification interactions, menu selections, formatting interactions, image entry or manipulation interactions, or any other user interaction that may be tracked by a computer or computer program.

When the user moves the cursor 204 past a particular indicator 206, such as a first indicator 208, the first indicator 208 is removed from the control area 200, as shown by the difference between FIGS. 2A and 2B. Moreover, as the user moves the cursor 204 backwards in time (i.e., to the left in FIGS. 2A and 2B), the computer program changes to show each user interaction being cancelled, deleted, or undone. When the user stops moving the cursor 204 backwards in time, such as after passing the first indicator 208, the computer program reflects a first state that is prior to at least the user interaction linked to the first indicator 208.

Conversely, when the user moves the cursor 204 in the opposite direction the indicators 206 are re-displayed in the control area 200. For example, as the user moves the cursor 204 forwards in time (i.e., to the right in FIGS. 2A and 2B), the computer program displays to the user each user interaction being repeated or redone. When the user stops moving the cursor 204 forwards in time, the computer program reflects a second state that is between the first state and a last-known state of the computer program. An example of this functionality would be moving the cursor 204 from its position in FIG. 2B to its position in FIG. 2A, thereby restoring the first indicator 208.

Figure 3:
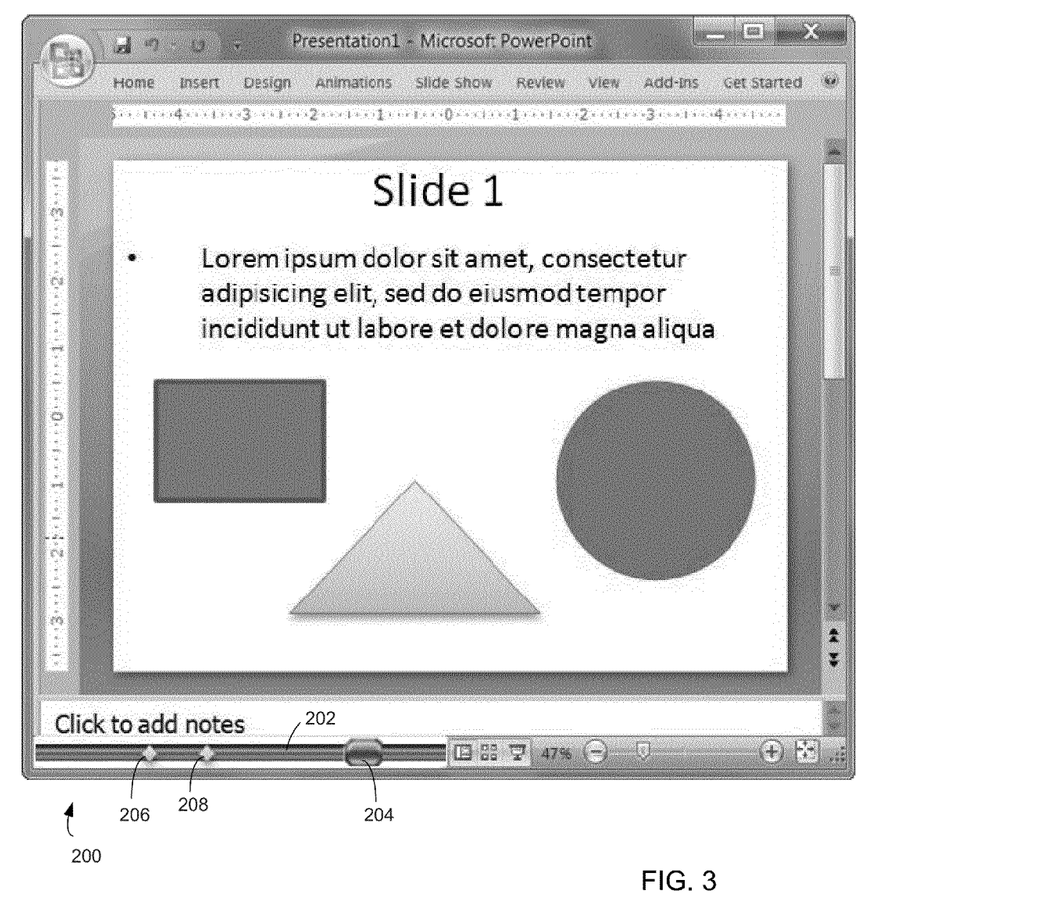
FIGS. 3 and 4 are diagrams that illustrate exemplary implementations of the control area in computer programs.
Figure 4:
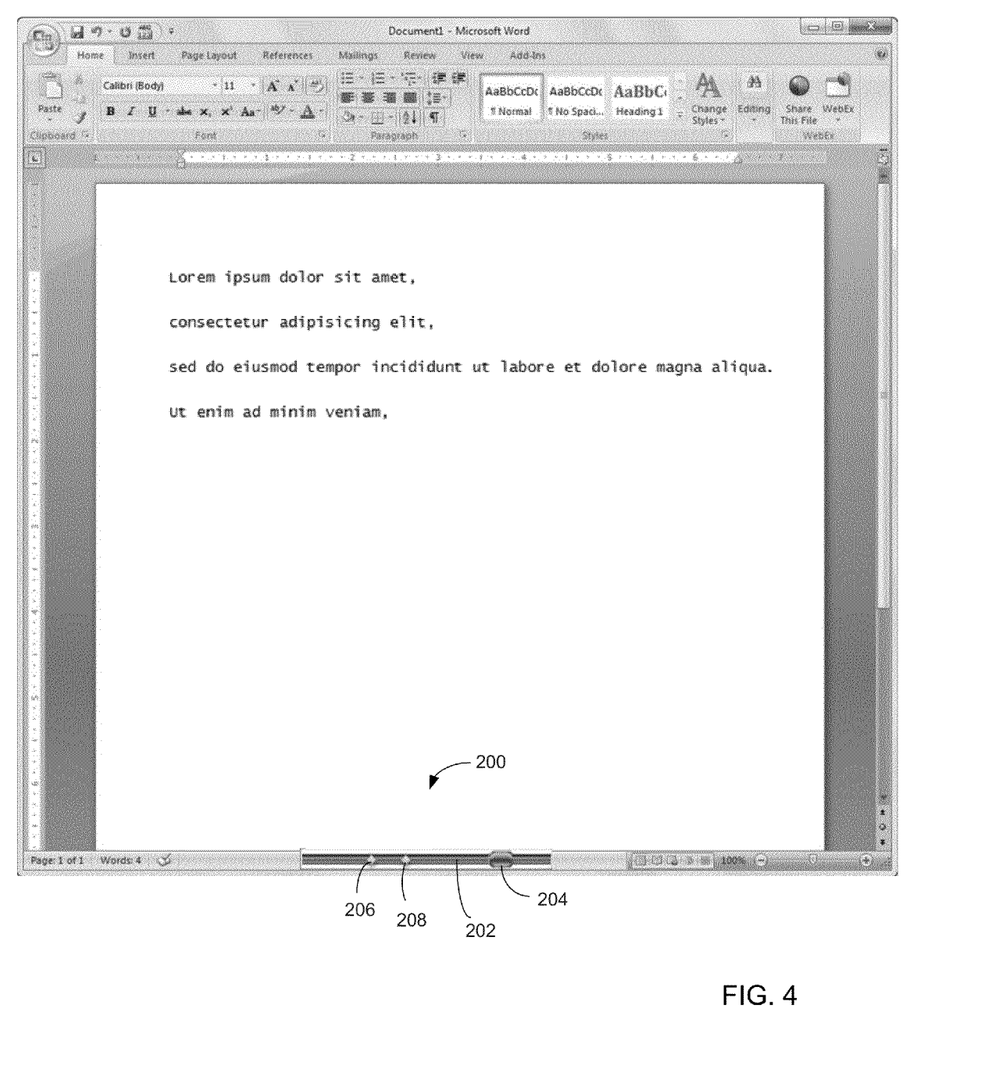

FIGS. 3 and 4 are diagrams that illustrate exemplary implementations of the control area 200 in computer programs. Specifically, FIG. 3 illustrates use of the control area 200 in presentation program and FIG. 4 illustrates use of the control area 200 in a word processing program.

As shown in FIG. 3, a user has created numerous text and shape items via user interactions such as are known in the art. The control area 200 shown in FIG. 3 includes a cursor 204 and user interaction indicators 206 along a timeline 202. Each indicator 206 is associated in a memory area with a particular user interaction. When the user moves the cursor 204 past a particular indicator 206, such as the first indicator 208, the first indicator 208 is removed from the control area 200. Moreover, as the user moves the cursor 204 backwards in time (i.e., to the left in FIG. 3), the presentation program changes to show each user interaction being cancelled, deleted, or undone. When the user stops moving the cursor 204 backwards in time, such as after passing the first indicator 208, the presentation program reflects a first state that is prior to at least the user interaction linked to the first indicator 208.

Conversely, when the user moves the cursor 204 in the opposite direction the indicators 206 are re-displayed in the control area 200. For example, as the user moves the cursor 204 forwards in time (i.e., to the right in FIG. 3), the presentation program displays to the user each user interaction being repeated or redone. When the user stops moving the cursor 204 forwards in time, the presentation program reflects a second state that is between the first state and a last-known state of the presentation program.

FIG. 4 illustrates a similar example when using a word processing program. As shown in FIG. 4, a user has created numerous text items via user interactions such as are known in the art. The control area 200 shown in FIG. 4 includes a cursor 204 and user interaction indicators 206 along a timeline 202. Each indicator 206 is associated in a memory area with a particular user interaction. When the user moves the cursor 204 past a particular indicator 206, such as the first indicator 208, the first indicator 208 is removed from the control area 200. Moreover, as the user moves the cursor 204 backwards in time (i.e., to the left in FIG. 4), the word processing program changes to show each user interaction being cancelled, deleted, or undone. When the user stops moving the cursor 204 backwards in time, such as after passing the first indicator 208, the word processing program reflects a first state that is prior to at least the user interaction linked to the first indicator 208.

Conversely, when the user moves the cursor 204 in the opposite direction the indicators 206 are re-displayed in the control area 200. For example, as the user moves the cursor 204 forwards in time (i.e., to the right in FIG. 4), the word processing program displays to the user each user interaction being repeated or redone. When the user stops moving the cursor 204 forwards in time, the word processing program reflects a second state that is between the first state and a last-known state of the word processing program.

Figure 5:
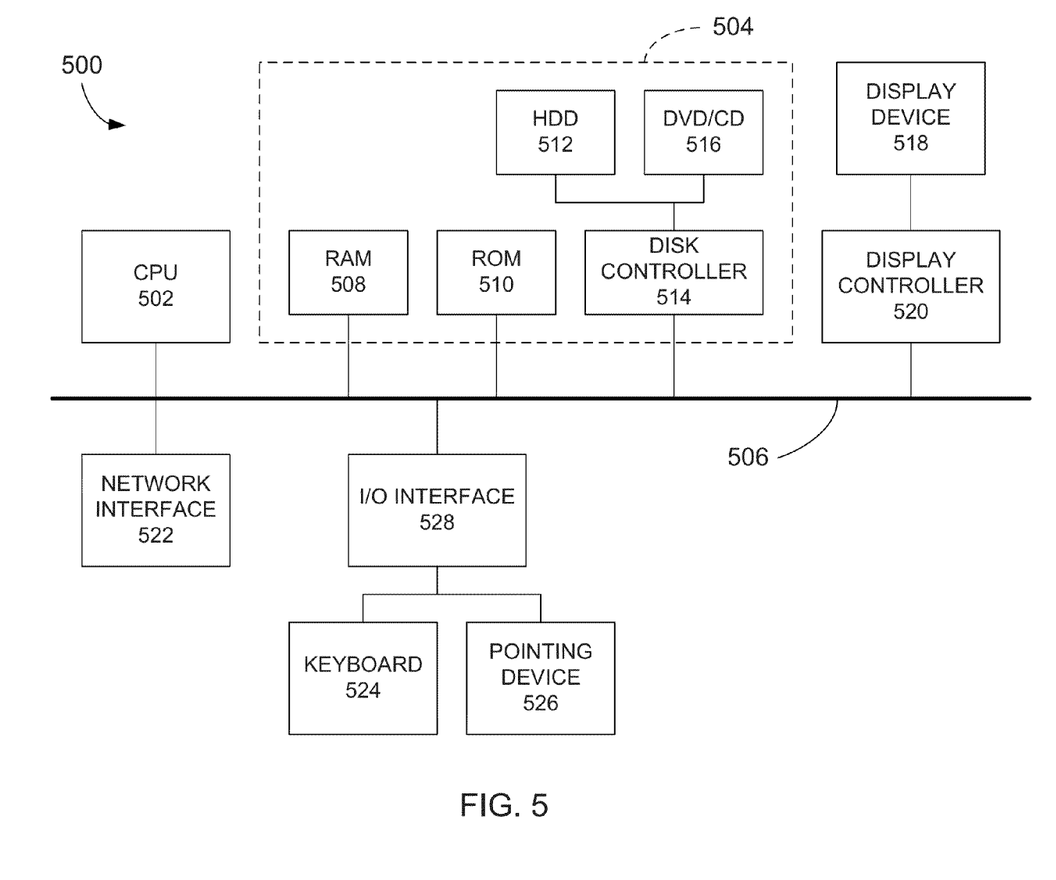
FIG. 5 is a schematic block diagram of an exemplary computer architecture that may be used with the computer-implemented method shown in FIG. 1.

FIG. 5 is a schematic block diagram of an exemplary computer architecture 500 for use in enabling undo and redo operations within a computer program interface. The computer architecture 500 of FIG. 5 may be used with a server system and/or a client system (both described in greater detail below and shown in FIG. 6).

In an exemplary embodiment, the computer architecture 500 includes one or more processors 502 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 504 that is operably and/or communicatively coupled to the processor 502 by a system bus 506. A "memory area," as used herein, refers generally to any means of storing non-transitory program code and instructions executable by one or more processors to aid in enabling undo and redo operations within a computer program interface, and/or for use in performing the processes described above and/or additional processes that may be related to those described above. The memory area 504 may include one, or more than one, forms of memory. For example, the memory area 504 may include random-access memory (RAM) 508, which can include non-volatile RAM, magnetic RAM, ferroelectric RAM, and/or other forms of RAM. The memory area 504 may also include read-only memory (ROM) 510 and/or flash memory and/or electrically-programmable read-only memory (EEPROM). Any other suitable magnetic, optical, and/or semiconductor memory, such as a hard-disk drive (HDD) 512, by itself or in combination with other forms of memory, may be included in the memory area 504. The HDD 512 may also be coupled to a disk controller 514 for use in transmitting and receiving messages to and from the processor 502. Moreover, the memory area 504 may also be, or may include, a detachable or removable memory 516, such as a suitable cartridge disk, CD-ROM, DVD, or USB memory. The above examples are exemplary only and, thus, are not intended to limit in any way the definition and/or meaning of the term "memory area."

The computer architecture 500 also includes a display device 518 that is coupled, such as operatively coupled, to a display controller 520. The display controller 520 receives data via the system bus 506 for display by the display device 518. The display device 518 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 518 may include a touchscreen with an associated touchscreen controller 520. The above examples are exemplary only and, thus, are not intended to limit in any way the definition and/or meaning of the term "display device."

In addition, the computer architecture 500 includes a network interface 522 for use in communicating with a network (not shown in FIG. 5). Moreover, the computer architecture 500 includes one or more input devices, such as a keyboard 524 and/or a pointing device 526, such as a roller ball, mouse, touchpad, and the like. The input devices are coupled to and controlled by an input/output (I/O) interface 528, which is further coupled to the system bus 506.

A description of the general features and functionality of the display device 518, keyboard 524, pointing device 526, as well as the display controller 520, disk controller 514, network interface 522, and I/O interface 528 is omitted herein for brevity as these features are known.

During operation, the processor 502 creates a video record of the computer program display and user interactions with a computer program. The video record may be created using any known method of recording a computer screen. Alternatively, the processor 502 may create the video record by capturing still frames at a specified rate. In an exemplary embodiment, the processor 502 stores the video record in the memory area 504. In some embodiments, the user is able to specify the location in which the video record is stored. The processor 502 that is responsible for executing the computer program also detects the user interactions. The term "user interactions" includes, but is not limited to only including, text entry or modification interactions, menu selections, formatting interactions, image entry or manipulation interactions, or any other user interaction that may be tracked by a computer or computer program. As the video record is stored in the memory area 504, the processor 502 applies a timestamp and a unique identifier for each user interaction and stores each in the memory area in associate with the respective user interaction. This enables the computer architecture 500 to more granularly track the user interactions. In some embodiments, the processor 502 will perform re-sizing of the video record file or files such that only a certain number of user interactions are available to the user, or such that only a certain amount of time within the video record is available to the user.

In an exemplary embodiment, the processor 502 causes the display device 518 to display a control area, such as control area 200 (shown in FIGS. 2A, 2B, 3, and 4) that enables the user to undo or redo user interactions with the computer program. The control area 200 may be positioned along, for example, a window border of the computer program. Alternatively, the control area 200 may be a floating modal dialog within the window of the computer program or outside of the window of the computer program. In some embodiments, the user may reposition the control area 200 by dragging the control area 200 to a desired location. In an exemplary embodiment, the processor 502 also causes the display device 518 to display indicators, such as indicators 206 (shown in FIGS. 2A, 2B, 3, and 4) within the control area 200 in order to indicate to the user the time positions of at least a portion of the recorded user interactions. While moving the cursor 204 (shown in FIGS. 2A, 2B, 3, and 4), the display device 518 displays to the user the state of the computer program changing, as if the user were watching a video of the changes made to the computer program.

During continued use of the computer program, the processor 502 receives user inputs via keyboard 524 and/or pointing device 526, wherein the user inputs are related to undoing or redoing one or more particular user interactions. The user input may be via dragging a cursor icon along a timeline using the pointing device 526, via arrow buttons or page up and page down buttons on the keyboard 524, gestures input through the pointing device 526 or received via the display device 518 in the case of a touchscreen, or any other suitable input method. When the user releases the cursor, the computer program is restored to its state at the selected point in time. Regardless of the method of input, the user input will be either a rewind user command or an advance user command. Moreover, the user will reposition the cursor such that it erases a past chosen user interaction indicator in order to affect an undo command. Alternatively, the user will reposition the cursor such that a previously undone user interaction indicator is again displayed in order to affect a redo command.

If the user input is a rewind user command, the processor 502 reverts to a first state of the computer program that is prior to the user interactions that are cancelled, deleted, or undone. Moreover, the processor 502 causes the display device 518 to display the reversion of the computer program to the first state. For example, the processor 502 determines the timestamp of each user interaction as the cursor passes an associated indicator by, for example, searching the memory area 504. The processor 502 also causes the display device 518 to display state of the computer program at the time just prior to the original detection of the cancelled, deleted, or undone user interaction.

If the user input is an advance user command, the processor 502 progresses to a second state of the computer program that is between the first state and a last-known state of the computer program. Moreover, the processor 502 causes the display device 518 to display the progression of the computer program between the first state and the second state. For example, the processor 502 determines the timestamp of each user interaction as the cursor passes an associated indicator by, for example, searching the memory area 504. In order to redo a previously cancelled, deleted, or undone user interaction, the processor 502 progresses to a state of the computer program as shown in the video record at the time just after the now restored user interaction.

Figure 6:
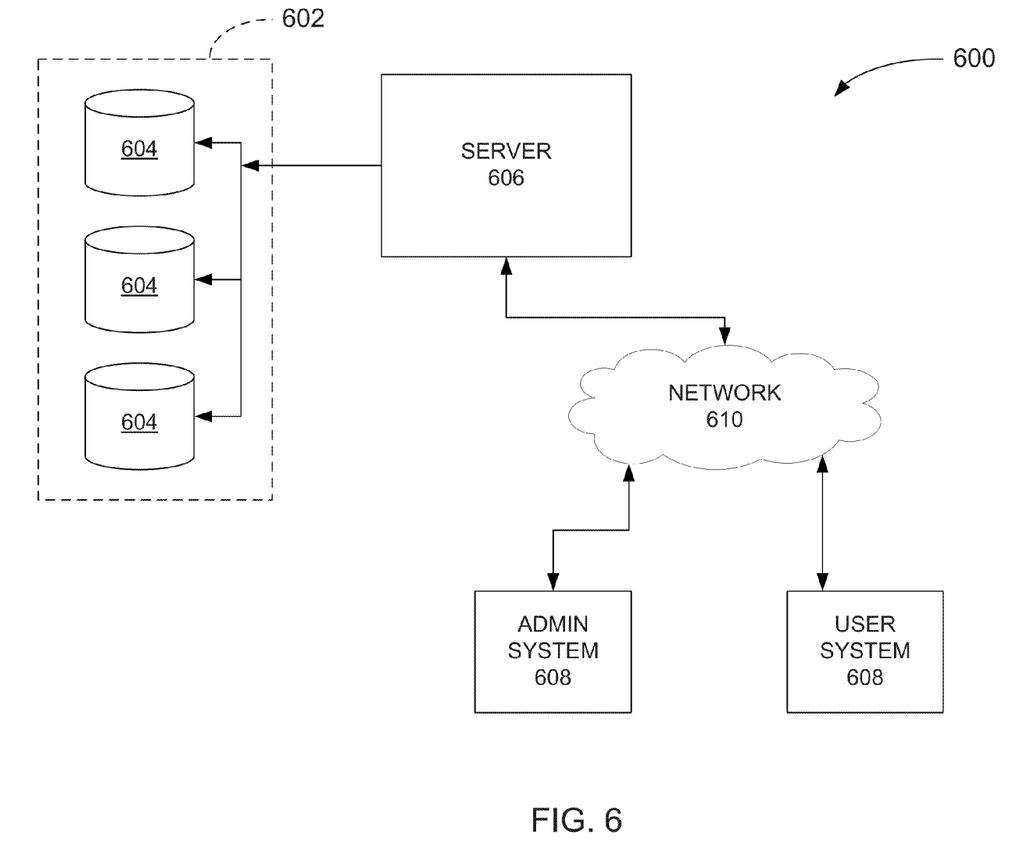
FIG. 6 is a schematic block diagram of an exemplary computer system that may be used with the computer-implemented method shown in FIG. 1.

FIG. 6 is a schematic block diagram of an exemplary computer system 600 for use in enabling undo and redo operations within a computer program interface, and/or for use in performing the processes described above and/or additional processes that may be related to those described above. In an exemplary embodiment, a memory area 602 includes one or more storage devices 604 for use in storing data, such as files created using computer programs, user interaction records tracked when creating such files and/or using such computer programs, and video recordings of user interactions with such computer programs. In some embodiments, the memory area 602 is coupled to a server system 606, which is in turn coupled to client systems 608 such as an administrator system and/or a user system, via a network 610. The storage devices 604 may be embodied as one or more databases, may be located at a single or at multiple geographical sites, or may be integrated with the server system 606.

As can be appreciated, the network 610 can be a public network, such as the Internet, or a private network such as an LAN or WAN network, or any combination thereof and can also include PSTN or ISDN sub-networks. The network 610 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 610 is merely exemplary and in no way limits the scope of the present advancements.

The client systems 608 can be any suitable computer architecture such as the computer architecture 500 described above with reference to FIG. 5, or any other computing architecture that is known. Moreover, it should be understood that the server system 606 is configured to perform the processes described above and/or any additional processes that may be related to those described above.

The server system 606 stores the computer-readable instructions to execute the processes described above, and provides these instructions via the network 610 to the client systems 608. Moreover, the server system 606 can also provide data from the memory area 602 as needed to the client systems 608 such that the client systems 608 execute the processes described above. As such, FIG. 6 includes implementations of the computer system 600 via cloud computing, distributed computing, and the like.

During operation, the client system 608 and/or the server system 606 creates a video record of the user interactions. The video record may be created using any known method of recording a computer screen. Alternatively, the client system 608 and/or the server system 606 may create the video record by capturing still frames at a specified rate. In an exemplary embodiment, the server system 606 stores the video record in the memory area 602. In some embodiments, the user is able to specify the location in which the video record is stored. The client system 608 that is responsible for executing the computer program also detects the user interactions. Alternatively, where the client systems 608 are thin clients, the server system 606 may detect the user interactions. The term "user interactions" includes, but is not limited to only including, text entry or modification interactions, menu selections, formatting interactions, image entry or manipulation interactions, or any other user interaction that may be tracked by a computer or computer program.

As the video record is stored in the memory area 602, the server system 606 applies a timestamp and a unique identifier for each user interaction and stores each in the memory area in associate with the respective user interaction. This enables the computer system 600 to more granularly track the user interactions. In some embodiments, the server system 606 will perform re-sizing of the video record file or files such that only a certain number of user interactions are available to the user, or such that only a certain amount of time within the video record is available to the user.

In an exemplary embodiment, the client system 608 displays a control area, such as control area 200 (shown in FIGS. 2A, 2B, 3, and 4) that enables the user to undo or redo user interactions with the computer program. The control area 200 may be positioned along, for example, a window border of the computer program. Alternatively, the control area 200 may be a floating modal dialog within the window of the computer program or outside of the window of the computer program. In some embodiments, the user may reposition the control area 200 by dragging the control area 200 to a desired location. In an exemplary embodiment, the client system 608 also displays indicators, such as indicators 206 (shown in FIGS. 2A, 2B, 3, and 4) within the control area 200 in order to indicate to the user the time positions of at least a portion of the recorded user interactions. While moving the cursor 204 (shown in FIGS. 2A, 2B, 3, and 4), the client system 608 displays to the user the state of the computer program changing, as if the user were watching a video of the changes made to the computer program.

During continued use of the computer program, the client system 608 and/or the server system 606 receives user inputs via an input device, wherein the user inputs are related to undoing or redoing one or more particular user interactions. The user input may be via dragging a cursor icon along a timeline, via arrow buttons or page up and page down buttons, gesture inputs, or any other suitable input method. When the user releases the cursor, the computer program is restored to its state at the selected point in time. Regardless of the method of input, the user input will be either a rewind user command or an advance user command. Moreover, the user will reposition the cursor such that it erases a past chosen user interaction indicator in order to affect an undo command. Alternatively, the user will reposition the cursor such that a previously undone user interaction indicator is again displayed in order to affect a redo command.

If the user input is a rewind user command, the server system 606 reverts to a first state of the computer program that is prior to the user interactions that are cancelled, deleted, or undone. Moreover, the client system 608 displays the reversion of the computer program to the first state. For example, the server system 606 determines the timestamp of each user interaction as the cursor passes an associated indicator by, for example, searching the memory area 602. The client system 608 displays the state of the computer program at the time just prior to the original detection of the cancelled, deleted, or undone user interaction.

If the user input is an advance user command, the server system 606 progresses to a second state of the computer program that is between the first state and a last-known state of the computer program. Moreover, the client system 608 displays the progression of the computer program between the first state and the second state. For example, the server system 606 determines the timestamp of each user interaction as the cursor passes an associated indicator by, for example, searching the memory area 602. In order to redo a previously cancelled, deleted, or undone user interaction, the client system 608 displays the progression to a state of the computer program as shown in the video record at the time just after the now restored user interaction.

Exemplary embodiments of systems, methods, apparatus, and computer-program products for use in enabling undo and redo operations within a computer program interface are described above in detail. systems, methods, apparatus, and computer-program products are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, such as the client systems and server systems, described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

Embodiments of the invention include a computer program product that includes one or more non-transitory computer-readable storage media having computer-executable components. Such computer-executable components include, for example, a recording component, an input recognition component, and a control component. In an exemplary embodiment, the recording component causes a processor, such as processor 502 (shown in FIG. 5) and/or server system 606 (shown in FIG. 6), to store a video record of user interactions with a computer program within a memory area, such as memory area 504 (shown in FIG. 5) or memory area 602 (shown in FIG. 6). The input recognition component causes the processor to receive a signal representative of a user input from an input device, such as keyboard 524, pointing device 526, and/or display device 518 (each shown in FIG. 5). The control component causes the processor to transmit a signal to a display device representative of a control area, such as control area 200 (shown in FIGS. 2-4). In response to receiving a rewind user command via the input device, the control component causes the processor to transmit a signal to the display device representative of a reversion to a first state of the computer program that is prior to at least one of the recorded user interactions. In response to receiving an advance user command via the input device, the control component causes the processor to transmit a signal to the display device representative of a progression to a second state of the computer program that is between the first state and a last-known state of the computer program.

In some embodiments, the control component causes the processor to transmit to the display device a signal representative of an indicator to be displayed within the control area of the respective positions in the video record of at least a portion of the recorded user interactions. Moreover, in some embodiments, and in response to receiving the rewind user command, the control component also causes the processor to transmit to the display device a signal representative of removal of the indicator of at least one of the recorded user interactions that occurs after the first state.

Moreover, in some embodiments, the recording component causes the processor to store in the memory area the user interactions with the computer program, wherein each user interaction includes an action identifier and a timestamp. In some embodiments, and in response to receiving the rewind user command, the control component causes the processor to set the video record to a time associated with a timestamp of a selected user interaction, and transmit to the display device a signal representative of reversion to a state of the computer program at a time before or equal to the timestamp of the selected user interaction. Furthermore, in some embodiments, and in response to receiving the advance user command, the control component further causes the processor to set the video record to a time associated with a timestamp of a selected user interaction, and transmit to the display device a signal representative of progression to a state of the computer program at a time equal to or after the timestamp of the selected user interaction.

In some embodiments, the input recognition component causes the processor to receive the rewind user input and the advance user input via at least one of a button selection, a dragging motion of a position indicator, and a menu selection.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   creating a video record of user interactions with a computer program;
   marking each user interaction with an action identifier and a time stamp;
   displaying a control area configured to receive a rewind user command and an advance user command;
   in response to receiving the rewind user command, reverting to a first state of the computer program that is prior to at least one of the recorded user interactions;
   in response to receiving the advance user command, progressing to a second state of the computer program that is between the first state and a last-known state of the computer program; and
   removing at least one action identifier that occurs after the first state.

2. A computer-implemented method in accordance with claim 1, further comprising indicating within the control area the respective positions in the video record of at least a portion of the recorded user interactions.

3. A computer-implemented method in accordance with claim 1, wherein reverting to a first state of the computer program comprises:
   setting the video record to a time associated with a timestamp of a selected user interaction; and
   reverting to a state of the computer program at a time before or equal to the timestamp of the selected user interaction.

4. A computer-implemented method in accordance with claim 1, wherein progressing to a second state of the computer program comprises:
   setting the video record to a time associated with a timestamp of a selected user interaction; and
   progressing to a state of the computer program at a time equal to or after the timestamp of the selected user interaction.

5. A computer comprising:
   a display device;
   an input device;
   a memory area configured to store a video record of a set of user interactions with a computer program; and
   a processor coupled to said display device, said input device, and said memory area, said processor configured to:
   cause said display device to display a control area;
   cause said display device to display an indicator within the control area of the respective positions in the video record of at least a portion of the recorded user interactions;
   in response to receiving a rewind user command via said input device, cause said display device to revert to a first state of the computer program that is prior to at least one of the set of user interactions;
   in response to receiving an advance user command via said input device, cause said display device to progress to a second state of the computer program that is between the first state and a last-known state of the computer program; and in response to receiving the rewind user command, said processor is further configured to cause said display device to remove the indicator of at least one of the recorded user interactions that occurs after the first state.

6. A computer in accordance with claim 5, wherein said memory area is further configured to store the user interactions with the computer program, wherein each user interaction includes an action identifier and a timestamp.

7. A computer in accordance with claim 6, wherein, in response to receiving the rewind user command, said processor is further configured to:

set the video record to a time associated with a timestamp of a selected user interaction; and cause said display device revert to a state of the computer program at a time before or equal to the timestamp of the selected user interaction.

8. A computer in accordance with claim 6, wherein, in response to receiving the advance user command, said processor is further configured to:

set the video record to a time associated with a timestamp of a selected user interaction; and cause said display device to progress to a state of the computer program at a time equal to or after the timestamp of the selected user interaction.

9. A computer in accordance with claim 5, wherein said input device is configured to receive the rewind user input and the advance user input via at least one of a button selection, a dragging motion of a position indicator, and a menu selection.

10. A computer program product comprising:

one or more non-transitory computer-readable storage media having computer-executable components, said components comprising:

a recording component that when executed by a processor causes the processor to store a video record of user interactions with a computer program within a memory area;

an input recognition component that when executed by the processor causes the processor to receive from an input device a signal representative of a user input; and a control component that when executed by the processor causes the processor to:

transmit to a display device (i) signal representative of a control area and (ii) a signal representative of an indicator to be displayed within the control area of the respective positions in the video record of at least a portion of the recorded user interactions;

in response to receiving a rewind user command via the input device, (i) transmit to the display device a signal representative of a reversion to a first state of the computer program that is prior to at least one of the recorded user interactions and (ii) transmit to the display device a signal representative of removal of the indicator of at least one of the recorded user interactions that occurs after the first state; and in response to receiving an advance user command via the input device, transmit to the display device a signal representative of a progression to a second state of the computer program that is between the first state and a last-known state of the computer program.

11. A computer program product in accordance with claim 10, wherein said recording component further causes the processor to store in the memory area the user interactions with the computer program, wherein each user interaction includes an action identifier and a timestamp.

12. A computer program product in accordance with claim 11, wherein, in response to receiving the rewind user command, said control component further causes the processor to:

set the video record to a time associated with a timestamp of a selected user interaction; and transmit to the display device a signal representative of reversion to a state of the computer program at a time before or equal to the timestamp of the selected user interaction.

13. A computer program product in accordance with claim 11, wherein, in response to receiving the advance user command, said control component further causes the processor to:

set the video record to a time associated with a timestamp of a selected user interaction; and transmit to the display device a signal representative of progression to a state of the computer program at a time equal to or after the timestamp of the selected user interaction.

14. A computer program product in accordance with claim 10, wherein said input recognition component further causes the processor to receive the rewind user input and the advance user input via at least one of a button selection, a dragging motion of a position indicator, and a menu selection.

* * * * *